G. H. BENTON.
VALVE.
APPLICATION FILED JUNE 20, 1908.

923,616.

Patented June 1, 1909.

WITNESSES
Edward Thorpe
Theo. G. Hoster

INVENTOR
George H. Benton
BY Munn & Co
ATTORNEYS

UNITED STATES PATENT OFFICE.

GEORGE H. BENTON, OF METUCHEN, NEW JERSEY.

VALVE.

No. 923,616.   Specification of Letters Patent.   Patented June 1, 1909.

Application filed June 20, 1908. Serial No. 439,483.

*To all whom it may concern:*

Be it known that I, GEORGE H. BENTON, a citizen of the United States, and a resident of Metuchen, in the county of Middlesex and State of New Jersey, have invented a new and Improved Valve, of which the following is a full, clear, and exact description.

The invention relates to globe valves, and its object is to provide a new and improved valve, arranged to permit convenient and quick renewal of the valve disk without discarding the other parts, to allow regrinding in a simple and effective manner and to prevent the packing from coming out of the stuffing box.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
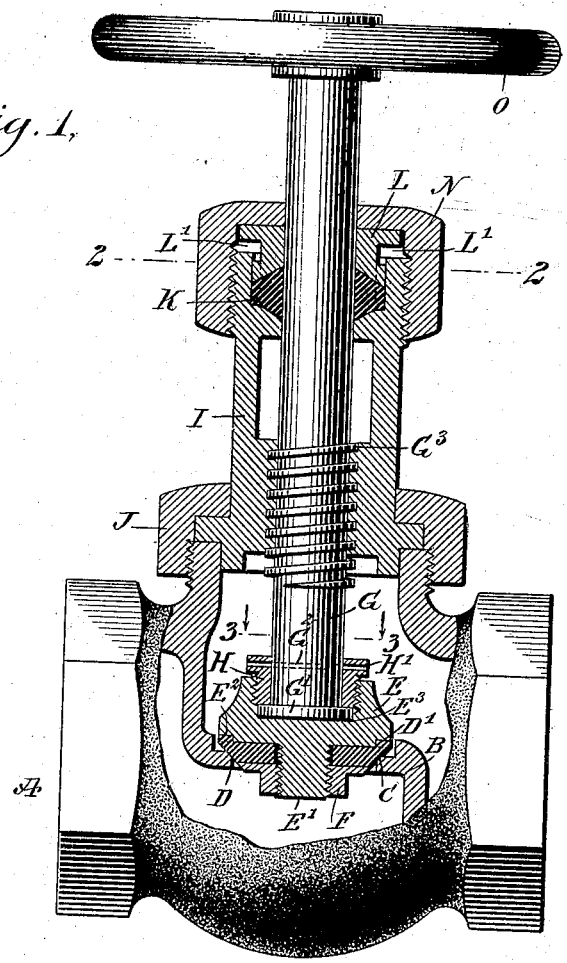
Figure 2:
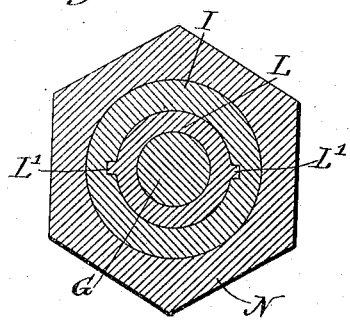
Figure 4:
Figure 3:
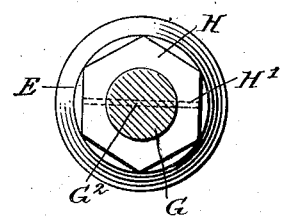

Figure 1 is a sectional side elevation of the improvement; Fig. 2 is a sectional plan view of the same on the line 2—2 of Fig. 1; Fig. 3 is a similar view of the same on the line 3—3 of Fig. 1; and Fig. 4 is a perspective view of the valve disk.

The shell or body A of the globe valve shown in Fig. 1, is provided with a diaphragm or bridge B formed with a beveled valve seat C, arranged below the top face of the diaphragm B, as plainly indicated in Fig. 1. The valve seat C is adapted to be engaged by a valve disk D of leather, hard rubber, metal or other suitable material and beveled at an angle of about 45°, to be seated on the correspondingly beveled valve seat C. The valve disk D is held on the under side of the carrier E provided with a depending threaded offset $E'$ centrally engaging the apertured disk valve D, and on the said offset $E'$ screws a retaining nut F against the under side of the valve disk D, to hold the latter in place on the carrier E. The valve disk D is provided at the top, and preferably at diametrically opposite points, with upwardly extending lugs $D'$ engaging correspondingly shaped recesses $E^2$ formed on the under side of the carrier E, to hold the valve disk D against turning on the carrier E. The stem or spindle G for moving the carrier E and the valve disk D toward and from the valve seat C, is provided at its lower end with the usual flange $G'$ engaging a seat $E^3$ formed in the top portion of the carrier E, and the said flange $G'$ is engaged by a retaining nut H screwing in the top of the carrier E, to allow the stem G to turn in the carrier and to cause the carrier to move with the stem when the latter is moved axially. When it is desired to regrind the valve seat C, the nut H and the stem G are locked together by the use of a suitable pin passing through registering apertures $H'$ and $G^2$ formed in the nut H and the stem G, as indicated in Figs. 1 and 3.

The stem G is provided with the usual threaded portion $G^3$, screwing in a bonnet I held in place on the shell or body A by a union nut J, and in the upper portion of the bonnet I is arranged a packing K engaged by a packing follower L fitted into the upper end of the bonnet I and having side-wise extending lips $L'$ (see Figs. 1 and 2), engaging corresponding grooves in the wall of the bore of the bonnet I containing the packing K. A nut N screws on the upper end of the bonnet I and engages the follower L, so as to move the latter downward against the packing K, it being understood that as the follower L is held against turning by its lugs $L'$, it is evident that the follower remains in position when unscrewing the nut N. When the operator turns the handle O on the stem or spindle G then the valve proper is moved toward or from its seat C according to the direction in which the handle O is turned. Now by arranging the valve seat C in the manner described, that is, below the upper surface of the diaphragm B, it is evident that wire drawing or injury to the seat is prevented by throttling the valve or hot steam striking the seat C.

By having the valve disk D in the form of a ring removably attached to the collar E, it is evident that the valve disk can be conveniently and quickly renewed in case it is worn out, without discarding any of the other parts of the valve proper. It will also be noted that when locking the nut H and the stem G together by a pin inserted in the registering holes $H'$, $G^2$ then the valve disk D and the seat C can be readily reground as the disk D is not liable to turn owing to the lugs $D'$ engaging the recesses $E^2$.

Having thus described my invention, I claim as new and desire to secure by Letters Patent:

1. A globe valve, comprising a shell provided with a diaphragm having a valve seat intermediate of its upper and lower faces, a carrier having an internally threaded seat in its top and provided with a central threaded depending offset and recesses in its under face, a valve disk on the threaded offset and having a beveled face and lugs on its upper face engaging the recesses of the carrier, a nut screwing onto the offset, a spindle having a flange at its lower end and a transverse opening adjacent to said flange, and a nut screwing into the seat of the carrier and provided with a transverse opening adapted to register with the opening of the spindle.

2. A globe valve, comprising a shell having a valve seat, a carrier having a depending threaded offset and recesses in its under face, a valve disk on the threaded offset and having a beveled face and lugs on its upper face engaging the recesses of the carrier, a spindle upon the lower end of which the carrier is loosely mounted, and means for locking the stem to the carrier to cause them to turn together.

3. A globe valve provided with a valve proper, comprising a carrier having a threaded offset and recesses in its under face, an apertured valve disk engaging the said offset and having a beveled face, a nut screwing on the said threaded offset and engaging the said valve disk to hold the latter in place on the said carrier, and lugs on the said valve disk and engaging recesses in the said carrier to hold the valve disk against turning on the carrier.

In testimony whereof I have signed my name to this specification in the presence of two subscribing witnesses.

GEORGE H. BENTON.

Witnesses:
 THEO. G. HOSTER,
 EVERARD B. MARSHALL.